(12) United States Patent
Sugiyama

(10) Patent No.: US 11,785,192 B2
(45) Date of Patent: Oct. 10, 2023

(54) VIDEO DISPLAY SYSTEM AND VIDEO DISPLAY METHOD

(71) Applicant: Panasonic Intellectual Property Management Co., Ltd., Osaka (JP)

(72) Inventor: Norimitsu Sugiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/543,154

(22) Filed: Dec. 6, 2021

(65) Prior Publication Data
US 2022/0094893 A1 Mar. 24, 2022

Related U.S. Application Data

(63) Continuation of application No. PCT/JP2020/033867, filed on Sep. 8, 2020.

(30) Foreign Application Priority Data

Sep. 9, 2019 (JP) .................................. 2019-163768

(51) Int. Cl.
H04N 9/31 (2006.01)
G03B 21/14 (2006.01)
H04N 5/272 (2006.01)

(52) U.S. Cl.
CPC ........... *H04N 9/3185* (2013.01); *H04N 5/272* (2013.01); *H04N 9/3147* (2013.01)

(58) Field of Classification Search
CPC .. H04N 9/3147; H04N 9/3185; H04N 9/3188; G03B 21/14
See application file for complete search history.

(56) References Cited

U.S. PATENT DOCUMENTS 9,711,114 B1 7/2017 Konttori et al.
2005/0128437 A1* 6/2005 Pingali ................. H04N 9/3185
353/69
(Continued)

FOREIGN PATENT DOCUMENTS

CN 107025455 8/2017
CN 108520498 9/2018
(Continued)

OTHER PUBLICATIONS

International Search Report dated Nov. 24, 2020 in corresponding International Application No. PCT/JP2020/033867.

*Primary Examiner* — Ryan D Howard
(74) *Attorney, Agent, or Firm* — Wenderoth, Lind & Ponack, L.L.P.

(57) ABSTRACT

A video display system of the present disclosure includes a first display device configured to project a background image onto a region of an entire image including a predetermined important image, the background image including a masked region of the important image clipped from the entire image, a second display device configured to project the important image clipped from the entire image onto the region of the important image in the background image that has been projected, and a controller configured to control a rotation angle around an optical axis the second display device with respect to the important image to be projected, in accordance with an aspect ratio of the important image to project the important image clipped from the entire image onto the region of the important image.

8 Claims, 14 Drawing Sheets

(56) References Cited

U.S. PATENT DOCUMENTS

| | | |
|---|---|---|
| 2006/0190811 A1 | 8/2006 | Ohno |
| 2010/0097393 A1 | 4/2010 | Yoneno |
| 2016/0142640 A1 | 5/2016 | Niida |
| 2017/0329208 A1 | 11/2017 | Takahashi |

FOREIGN PATENT DOCUMENTS

| | | |
|---|---|---|
| EP | 3330773 | 6/2018 |
| JP | 2006-215925 | 8/2006 |
| JP | 2007-48194 | 2/2007 |
| JP | 2010-97056 | 4/2010 |
| JP | 2010-153983 | 7/2010 |
| JP | 2010-266714 | 11/2010 |
| JP | 2014-10264 | 1/2014 |
| JP | 2016-100636 | 5/2016 |
| JP | 2016-188904 | 11/2016 |
| JP | 2018-109746 | 7/2018 |
| JP | 2018-113675 | 7/2018 |
| WO | 2016/098600 | 6/2016 |

* cited by examiner

FIG. 4

OPERATION PROCESSING OF IMPORTANT IMAGE DISPLAY DEVICE 1
- S101 SET NETWORK
- S102 ACTIVATE AS TIME PRIMARY DEVICE
- S103 SYNCHRONIZE TIME
- S104 IMPORTANT IMAGE DISPLAY PROCESSING
- END

OPERATION PROCESSING OF BACKGROUND IMAGE DISPLAY DEVICE 2A
- S201 SET NETWORK
- S202 ACTIVATE AS TIME SECONDARY DEVICE
- S203 SYNCHRONIZE TIME
- S204A SET PROJECTION DESTINATION SCREEN TO SCREEN 3A
- S205 BACKGROUND IMAGE DISPLAY PROCESSING
- END

OPERATION PROCESSING OF BACKGROUND IMAGE DISPLAY DEVICE 2B
- S201 SET NETWORK
- S202 ACTIVATE AS TIME SECONDARY DEVICE
- S203 SYNCHRONIZE TIME
- S204B SET PROJECTION DESTINATION SCREEN TO SCREEN 3B
- S205 BACKGROUND IMAGE DISPLAY PROCESSING
- END

OPERATION PROCESSING OF BACKGROUND IMAGE DISPLAY DEVICE 2C
- S201 SET NETWORK
- S202 ACTIVATE AS TIME SECONDARY DEVICE
- S203 SYNCHRONIZE TIME
- S204C SET PROJECTION DESTINATION SCREEN TO SCREEN 3C
- S205 BACKGROUND IMAGE DISPLAY PROCESSING
- END

VIDEO DISPLAY SYSTEM AND VIDEO DISPLAY METHOD

TECHNICAL FIELD

The present disclosure relates to a video display system and a video display method, and more specifically to a video display system and a video display method using a plurality of video display devices including a projection video display device.

BACKGROUND ART

Patent Literature 1 discloses an information processing apparatus capable of locally changing characteristics of a projection image. The information processing apparatus according to Patent Literature 1 controls a first projection unit so that the first projection unit projects a first image on an image projection surface. The information processing apparatus further controls a second projection unit so that the second projection unit projects a second image on a target image region (important image region) that is a predetermined partial region in the first image projected by the first projection unit onto the image projection surface.

CITATION LIST

Patent Literature

PTL 1: International Publication No. 2016/098600 A

SUMMARY OF THE INVENTION

However, in the method of PTL 1, in a case where the important image region is long in a vertical direction, a display area per one projector is small when the important image region is projected by a plurality of projectors. Thus, an enlargement ratio per one projector is increased, and an intended sense of resolution cannot be obtained. Further, a sense of contrast is reduced in a region where videos of the plurality of projectors overlap.

The present disclosure provides a video display system and a video display method capable of displaying a video while reducing deterioration in the sense of resolution and the sense of contrast even when an important image region is long in a vertical direction.

A video display system of the present disclosure includes a first display device configured to project a background image onto a region of an entire image including a predetermined important image, the background image including a masked region of the important image clipped from the entire image, a second display device configured to project the important image clipped from the entire image onto the region of the important image in the background image that has been projected, and a controller configured to control a rotation angle around an optical axis of the second display device with respect to the important image to be projected, in accordance with an aspect of the important image to project the important image clipped from the entire image onto the region of the important image.

According to the video display system and the like of the present disclosure, even in a case where the region of the important image is long in the vertical direction, a video can be projected while deterioration in the sense of resolution and the sense of contrast is being reduced.

BRIEF DESCRIPTION OF DRAWINGS

FIG. 4 is a sequence diagram illustrating an operation example of important image display device 1 and a background image display device of the video display system in FIG. 1.

DESCRIPTION OF EMBODIMENTS

Figure 1:
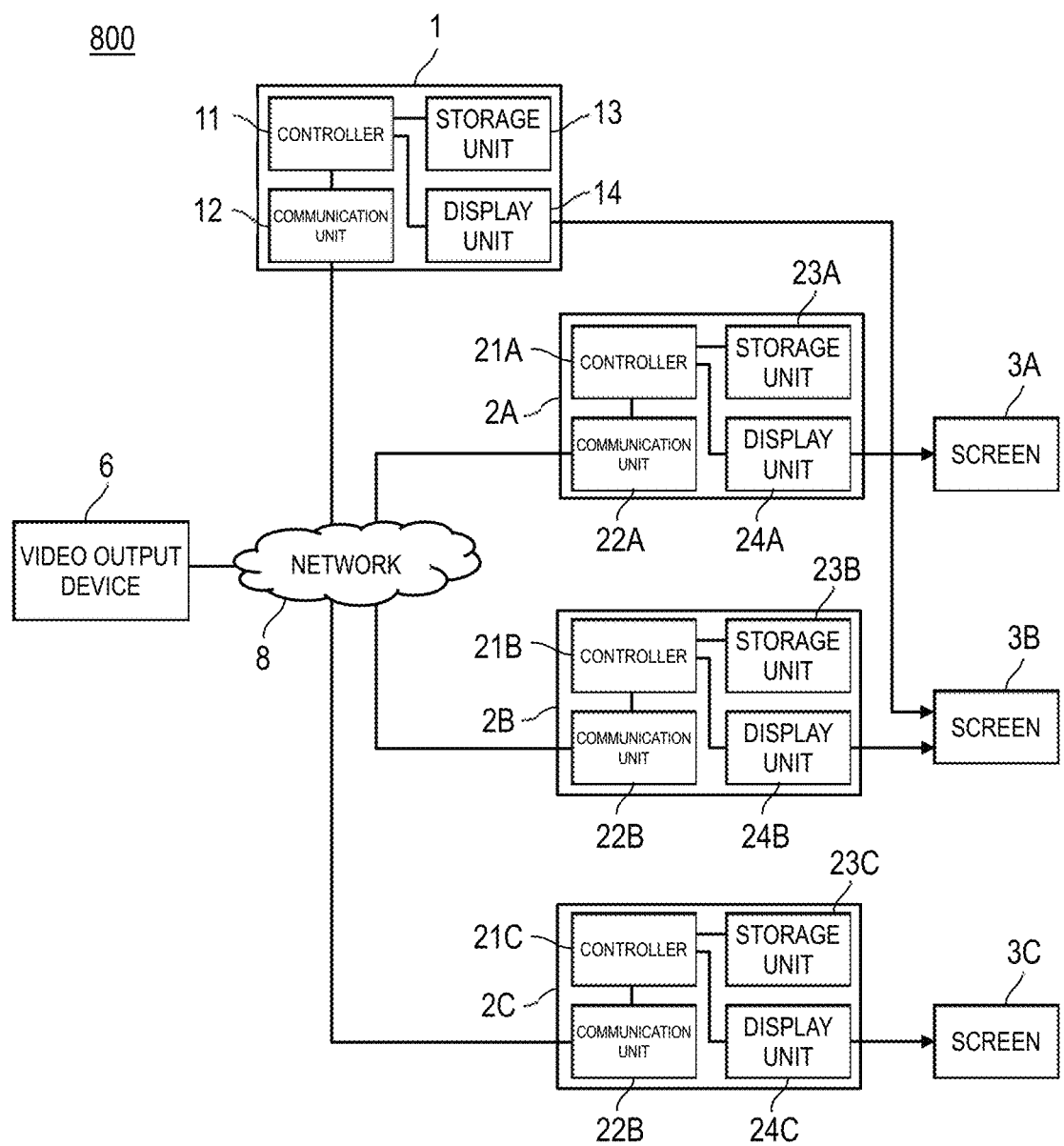
FIG. 1 is a block diagram illustrating a configuration example of a video display system according to a first exemplary embodiment.

Some exemplary embodiments will be described below in detail with reference to the drawings as appropriate. It is noted that unnecessarily detailed description may be omitted. For example, the detailed description of already well-known matters and overlapping description of substantially the same configurations may be omitted. This is to avoid unnecessary redundancy of the following description and to facilitate understanding of those skilled in the art.

Note that the inventor provides the attached drawings and the description below to help those skilled in the art fully understand the present disclosure, and does not intend to limit the subject matter as recited in the claims to these.

In addition, it should be noted that the drawings are schematic, and ratios of dimensions and the like are different from actual ones. Therefore, specific dimensions, etc. should be understood in view of the following description.

In addition, in the drawings, dimensional relationships and ratios may differ from one another.

First Exemplary Embodiment

A first exemplary embodiment will be described below with reference to FIGS. 1 to 10.

FIG. 1 is a block diagram illustrating a configuration example of video display system 800 according to the first exemplary embodiment. In FIG. 1, video display system 800 includes important image display device 1 (second display device), background image display devices 2A, 2B, 2C (first display devices), screens 3A, 3B, 3C, video output device 6, and network 8.

In FIG. 1, network 8 is, for example, a network such as a local region network (LAN). Important image display device 1, background image display devices 2A, 2B, 2C, and video output device 6 are communicably connected to each other via network 8.

Important image display device 1 includes controller 11, communication unit 12, storage unit 13, and display unit 14. Communication unit 12 communicates with network 8, and transmits and receives various signals, image data, and the like to and from video output device 6 and background image display devices 2A, 2B, 2C. Controller 11 outputs various commands and image data to communication unit 12, storage unit 13, and display unit 14 in accordance with the signals and image data received from video output device 6 via communication unit 12, and makes control. Storage unit 13 stores a program necessary for processing of controller 11 and image data from controller 11, and outputs these data to controller 11 as necessary. Display unit 14 is controlled by controller 11, and projects video light onto screen 3B to display an image.

Background image display device 2A includes controller 21A, communication unit 22A, storage unit 23A, and display unit 24A. Background image display device 2A is disposed so that a displayable region of background image display device 2A substantially matches an entire region of screen 3A. Communication unit 22A communicates with network 8, and transmits and receives various signals, image data, and the like to and from video output device 6 and important image display device 1. Controller 21A outputs various commands and image data to communication unit 22A, storage unit 23A, and display unit 24A in accordance with the signals and image data received from video output device 6 via communication unit 22A, and makes control. Storage unit 23A stores a program necessary for processing of controller 21A and image data from controller 21A, and outputs these data to controller 21A as necessary. Display unit 24A is controlled by controller 21A, and projects video light onto screen 3A to display an image.

Configurations of background image display devices 2B, 2C are similar to the configuration of background image display device 2A, and the detailed description thereof will be omitted. However, a difference in the configuration is that background image display device 2B displays an image on screen 3B, and background image display device 2C displays an image on screen 3C. Note that images from both important image display device 1 and background image display device 2B are superimposed and displayed on screen 3B. Screens 3A, 3B, 3C are video projection surfaces such as white screens, and receive video light from important image display device 1 and background image display devices 2A, 2B, 2C to display images.

Figure 2:
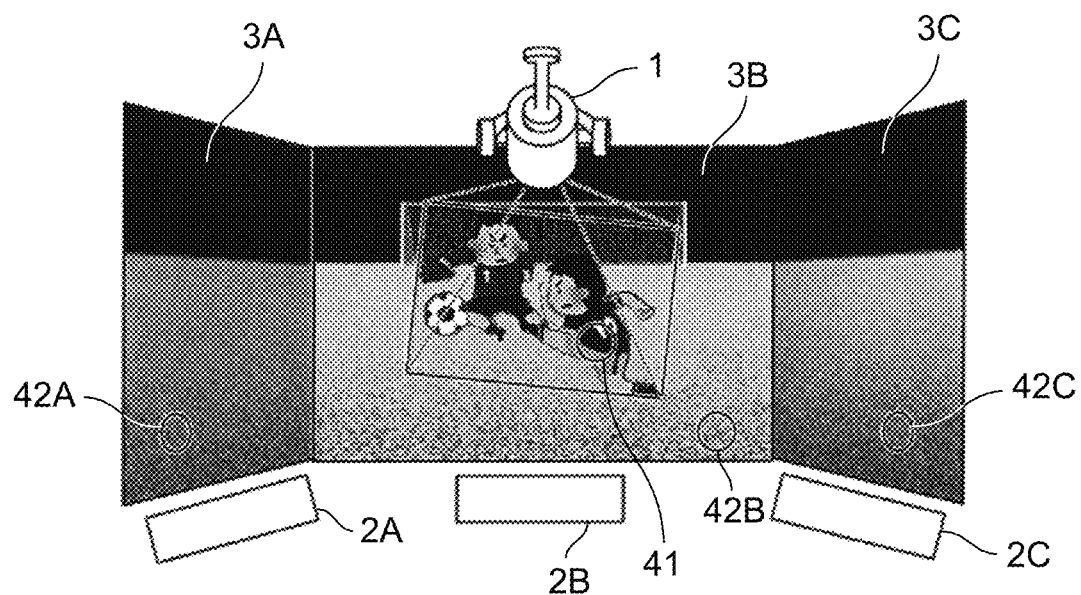
FIG. 2 is a perspective view illustrating an example of an external appearance of the video display system in FIG. 1.

FIG. 2 is a perspective view illustrating an appearance example of video display system 800 in FIG. 1. As illustrated in FIG. 2, important image display device 1 projects and displays important image 41 on screen 3B. Further, background image display devices 2A, 2B, 2C project and display background images 42A, 42B, 42C on screens 3A, 3B, 3C, respectively.

Figure 3:
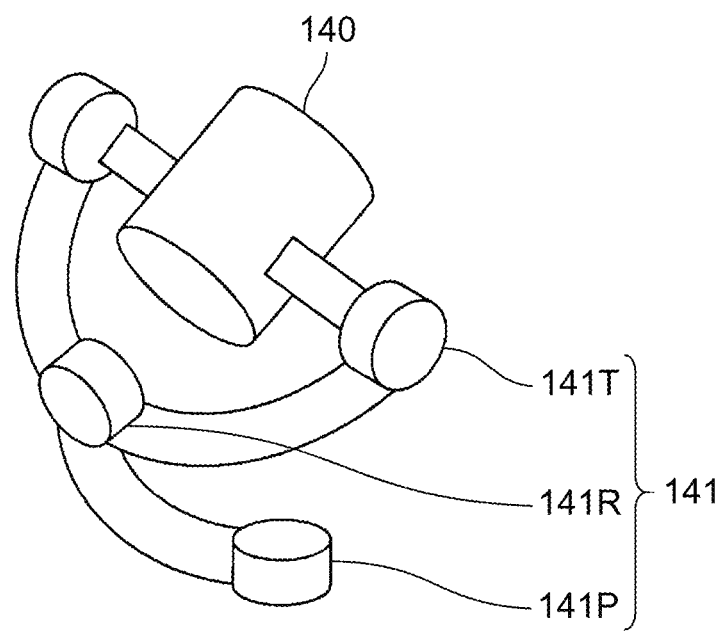
FIG. 3 is a perspective view illustrating an example of a detailed configuration of an important image display device in FIG. 1.

FIG. 3 is a perspective view illustrating a detailed configuration example of important image display device 1 in FIG. 1. In FIG. 3, important image display device 1 includes display device unit 140 and three-axis drive mechanism unit 141. Display device unit 140 is a projector or the like, and converts light of light source into video light in accordance with an input video signal using a digital mirror device, a lens, and the like. Three-axis drive mechanism unit 141 includes tilt drive unit 141T, roll drive unit 141R, and pan drive unit 141P. Tilt drive unit 141T is driven and controlled by controller 11 to rotate, and changes tilt angle γ which is an elevation angle of an optical axis of display device unit 140. Similarly, roll drive unit 141R changes roll angle α, which is a rotation angle around the optical axis of display device unit 140. Pan drive unit 141P changes pan angle β, which is an azimuth angle of the optical axis of display device unit 140. Here, display device unit 140 is disposed so that the optical axis is oriented toward the center of the surface of screen 3B when both pan angle β and tilt angle γ are 0 degrees. Note that although tilt drive unit 141T is driven and controlled by controller 11 as described above, the present disclosure is not limited thereto. Tilt drive unit 141T may be driven and controlled not by controller 11 included in important image display device 1 but by another controller included in video display system 800. The same applies to roll drive unit 141R and pan drive unit 141P.

A detailed operation of video display system 800 having the above configuration will be described below.

FIG. 4 is a sequence diagram illustrating an operation example of important image display device 1 and background image display devices 2A, 2B, 2C of video display system 800 in FIG. 1. In FIG. 4, processing in step S103 and processing in step S203 are simultaneously executed. Processing in step S104 and processing in step S205 are simultaneously executed.

In FIG. 4, in step S101, a setting value for connecting important image display device 1 to network 8 is input, and the connection to network 8 is set. That is, important image display device 1 is connected to network 8 to acquire an IP address, and acquires information such as IP addresses of background image display devices 2A, 2B, 2C and video output device 6 connected to network 8. Similarly, in step S201, setting values for connecting also background image display devices 2A, 2B, 2C to network 8 are input, and the connection to network 8 is set so that the connection to network 8 is established. As a result, important image display device 1, background image display devices 2A, 2B, 2C, and video output device 6 are communicably connected to each other through network 8.

In step S102, important image display device 1 itself is set as a time master device and activated. In step S202, background image display devices 2A, 2B, 2C themselves are set as time slave devices and activated. These steps S102 and S202 are preparation steps for the processing in next steps S103 and S203, respectively, and the detailed operation will be described below.

In steps S103 and S203, important image display device 1 and background image display devices 2A, 2B, 2C per-form time synchronization with each other. That is, important image display device 1 set and activated as a time master device in step S102 transmits a time synchronization signal indicating the timing of clock of important image display device 1 to background image display devices 2A, 2B, 2C. Background image display devices 2A, 2B, 2C receive the time synchronization signal and adjust the timing of their own clocks so that the timing of their own clocks is identical to the timing of the clock of important image display device 1.

In step S204A, background image display device 2A sets screen 3A as its own projection destination screen. For example, information indicating the projection destination screen is included in a signal transmitted from video output device 6 to background image display device 2A. The projection destination screen may be set based on the information, or may be input by a user. Step S104 is important image display processing, and step S205 is background image display processing. Details of the processing will be described later.

Figure 5:
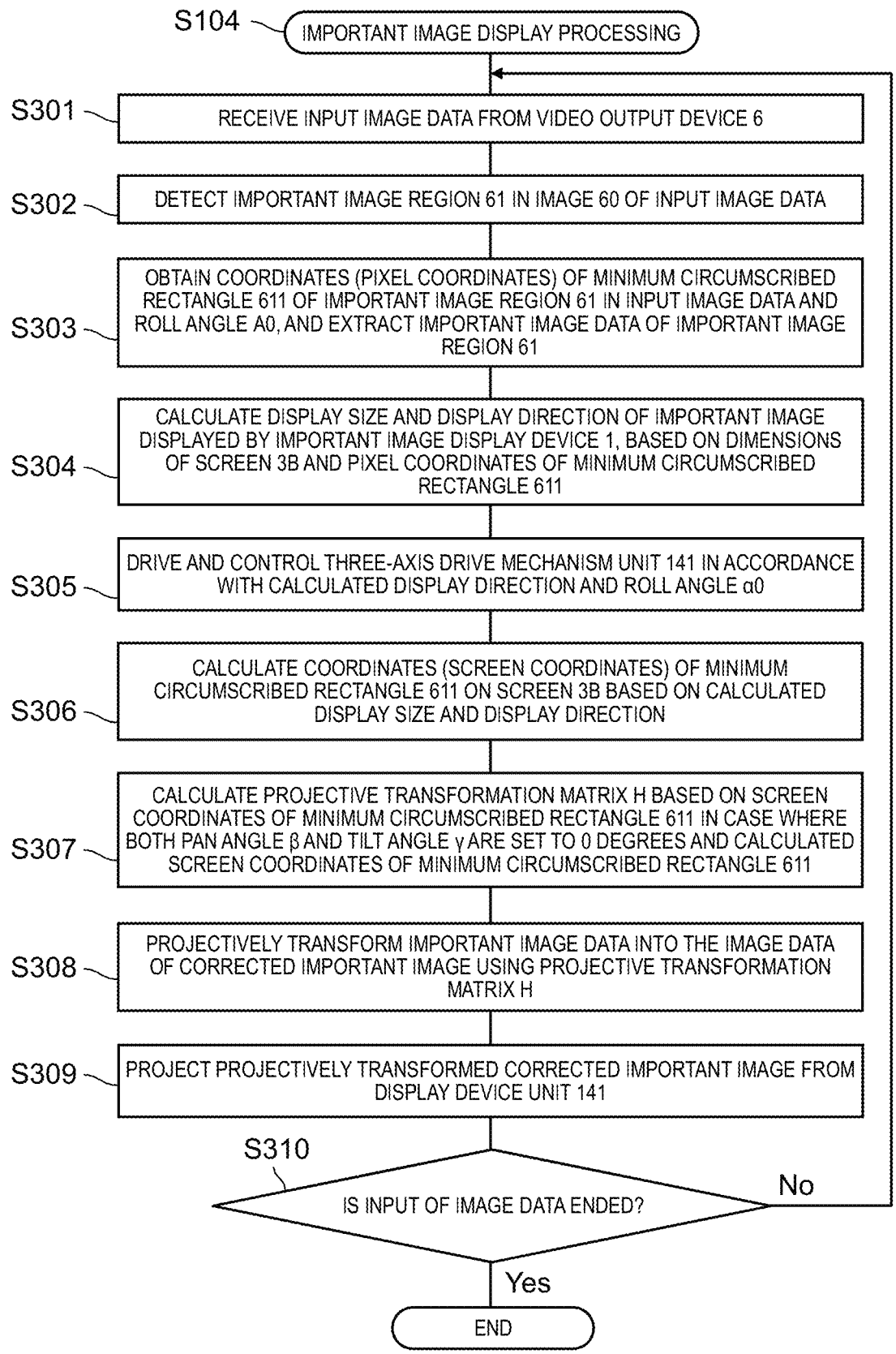
FIG. 5 is a flowchart illustrating a detailed operation example of important image display processing in FIG. 4.

FIG. 5 is a flowchart illustrating a detailed operation example of the important image display processing S104 in FIG. 4. In FIG. 5, the important image display processing S104 includes steps S301 to S310. In step S301, important image display device 1 receives input image data from video output device 6. The input image data is, for example, image data for one frame of a temporally continuous video signal.

In step S302, important image display device 1 detects important image region 61 in image 60 of the input image data. Important image region 61 is a partial region of the image region of image 60 of the input image data, and indicates a region to be noted in the image region of image 60. For example, when the video to be displayed is a soccer game video, the video of important image region 61 is a video of a region including soccer players and a soccer ball. Important image region 61 may be set by important image display device 1 based on information indicating the position of important image region 61 included in the input image data to be input. Alternatively, important image region 61 may be automatically detected by important image display device 1 based on a genre of the input video (in the above example, "soccer game" or the like).

In step S303, important image display device 1 obtains coordinates (pixel coordinates) of minimum circumscribed rectangle 611 of important image region 61 in the input image data (described in detail later). Here, the pixel coordinates refer to coordinates in which a lower left end is the origin (0, 0), a right direction is a positive direction of an X axis, and an upper direction is a positive direction of a Y axis in the region displayed on screen 3B in the input image data. Further, the pixel coordinates of minimum circumscribed rectangle 611 refer to a set of pixel coordinates of four vertexes of minimum circumscribed rectangle 611. Thereafter, important image display device 1 obtains angle (inclination angle) α0 formed by the long side of minimum circumscribed rectangle 611 and a horizontal direction of screen 3B. Thereafter, important image display device 1 extracts a portion corresponding to important image region 61 in the input image data as the important image data.

In step S304, important image display device 1 calculates a display size and a display direction of the important image displayed by important image display device 1, based on the dimensions of screen 3B and the pixel coordinates of minimum circumscribed rectangle 611. Here, the display size of the important image refers to dimensions on screen 3B in a case where the important image is displayed on screen 3B. In addition, the display direction of the important image indicates a set of pan angle β0 and tilt angle γ0 of three-axis drive mechanism unit 141 at the time when the optical axis of display device unit 140 is oriented toward the center of minimum circumscribed rectangle 611 on screen 3B.

In step S305, important image display device 1 drives and controls three-axis drive mechanism unit 141 in accordance with the display direction and inclination angle α0. Specifically, three-axis drive mechanism unit 141 is driven and controlled so that roll angle α of roll drive unit 141R becomes calculated inclination angle α0, pan angle β of pan drive unit 141P becomes angle β0, and tilt angle γ of tilt drive unit 141T becomes angle γ0.

In step S306, important image display device 1 calculates coordinates (screen coordinates) of the four corner points of minimum circumscribed rectangle 611 on screen 3B based on the calculated display size and display direction of the important image.

In step S307, important image display device 1 calculates projective transformation matrix H based on the screen coordinates of minimum circumscribed rectangle 611 in a case where roll angle α, pan angle β, and tilt angle γ are all 0 degrees (the display direction is the front) and the screen coordinates of minimum circumscribed rectangle 611 in a case where pan angle β and tilt angle γ are the display direction calculated in step S304 (described in detail later). In step S308, important image display device 1 transforms the important image data into the image data of the corrected important image using projective transformation matrix H (described in detail later). The corrected important image is an image in which distortion caused by deviation of the display direction of display device unit 140 from the front is corrected. In step S309, the corrected important image is projected onto screen 3B via display device unit 140.

In step S310, a determination is made whether or not the input of the image data from video output device 6 is ended. When the input of the image data is ended (YES), the important image display processing S104 is ended. When the input of the image data is not ended (NO), the processing returns to step S301, and the important image display processing S104 is repeated.

A procedure for obtaining minimum circumscribed rectangle 611 and inclination angle α0 in step S303 will be described below with reference to FIGS. 6 and 7.

Figure 6:
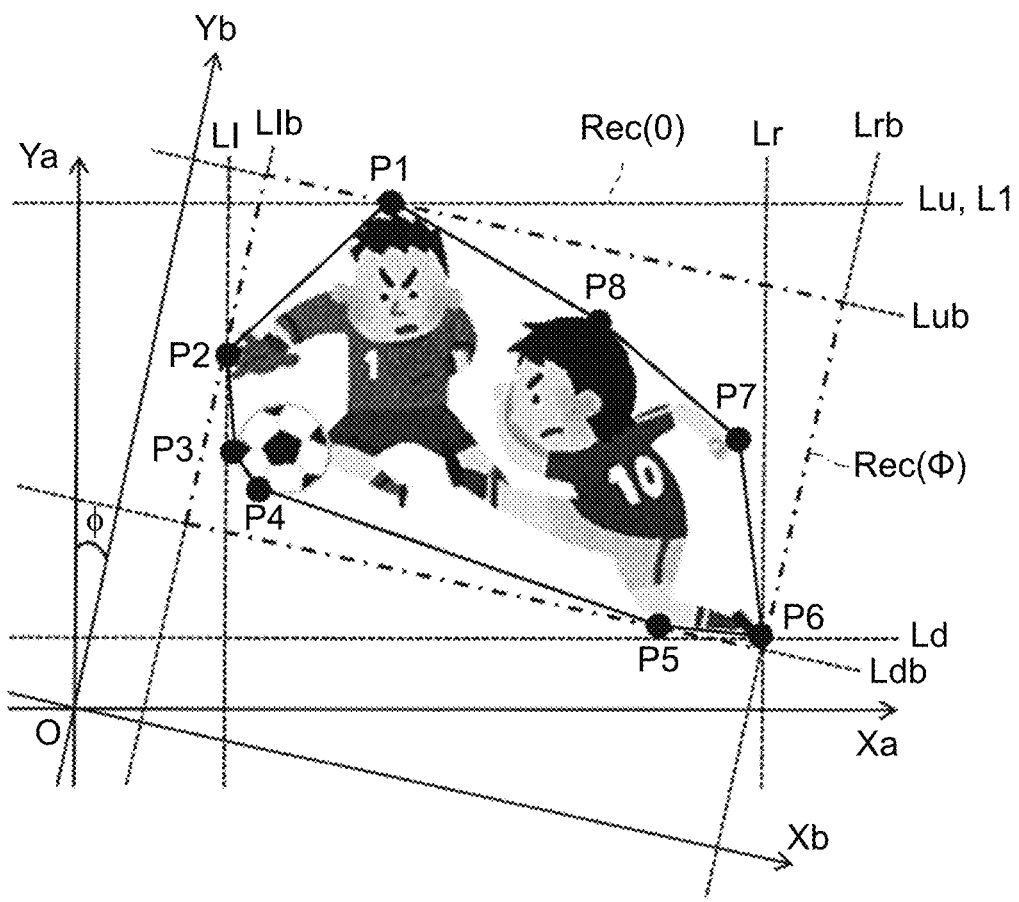
FIG. 6 is a plan view for describing a procedure for obtaining a minimum circumscribed rectangle of an important image region in the important image display processing in FIG. 4.

FIG. 6 is a plan view for describing a procedure for obtaining minimum circumscribed rectangle 611 of important image region 61 in the important image display processing S104 in FIG. 4. In step S303, in order to obtain minimum circumscribed rectangle 611 of important image region 61, important image display device 1 first obtains a polygon (envelope polygon) circumscribing important image region 61. The polygon can be obtained gradually as follows. For description, origin O at the lower left end of the image data of the input image is defined as pixel coordinates (0, 0), the right direction is defined as an Xa axis, and the upper direction is defined as a Ya axis. (Step SS1) A point having the largest Ya coordinate is set as point P1, and parameter i is set to 1. Further, a straight line passing through point P1 and parallel to the Xa axis is defined as straight line L1. (Step SS2) On the outline of important image region 61 (a pixel set adjacent to pixels not included in important image region 61), a pixel adjacent to point Pi is set as point P, and angle θ(i) formed by straight line PiP and straight line Li is obtained. (Step SS3) Point P is moved to a point adjacent to point P in important image region 61, angle θ is obtained again, and obtained angle θ is compared with previous angle θ. Here, the processing in step SS3 repeated until obtained angle θ becomes larger than previous angle θ. (Step SS4) When obtained angle θ becomes larger than previous angle θ, previous point P (the angle becomes the minimum value) is set as point P(i+1). (Step SS5) Until this point P(i+1) matches point P1, parameter i is increased by one and steps SS2 to SS4 are repeated. Here, assuming that parameter i is n when point P(i+1) matches point P1, points P1, P2, . . . , Pn are vertices of the envelope.

However, in a case where the important image region is not continuous and the outline of the important image region is divided into a plurality of parts, the similar processing is executed on all the outlines to obtain a plurality of envelopes.

In the example of FIG. 6, points P1 to P8 and polygons P1 to P2- . . . -P8 closed by an envelope are obtained. As to vertexes P1 to P8 of the envelope obtained as described above, a straight line passing through vertex P6 having the largest Xa coordinate and parallel to the Ya axis is defined as straight line Lr, and a straight line passing through vertex P2 having the smallest Xa coordinate and parallel to the Ya axis is defined as straight line Ll. Further, a straight line passing through vertex P1 having the largest Ya coordinate and parallel to the Xa axis is defined as straight line Lu, and a straight line passing through vertex P6 having the smallest Ya coordinate and parallel to the Xa axis is defined as straight line Ld. A rectangle surrounded by these four straight lines Lr, Ll, Lu, Ld is circumscribed rectangle Rec(0) of important image region 61.

A similar circumscribed rectangle is considered in the Xb-Yb coordinate system in which the Xa axis and the Ya axis are rotated by the angle φ. A straight line passing through vertex P6 having the largest Xb coordinates and parallel to the Yb axis is defined as straight line Lrb, and a straight line passing through vertex P2 having the smallest Xb coordinates and parallel to the Yb axis is defined as straight line Llb. Further, a straight line passing through vertex P1 having the largest Yb coordinates and parallel to the Xb axis is defined as straight line Lub, and a straight line passing through vertex P5 having the smallest Yb coordinates and parallel to the Xb axis is defined as straight line Ldb. A rectangle surrounded by four straight lines Lrb, Llb, Lub, Ldb also becomes circumscribed rectangle Rec(φ) of important image region 61.

In this manner, a procedure for obtaining circumscribed rectangle Rec(φ) by rotating the Xa-Ya coordinate system by inclination angle φ is repeated between angle φ of 0° and angle φ of 180°, for example, at intervals of 1°. Further, inclination angle φ at which the area of circumscribed rectangle Rec(φ) is the smallest is set as inclination angle α0, and circumscribed rectangle Rec(α0) at this time is minimum circumscribed rectangle 611. Then, an aspect ratio based on minimum circumscribed rectangle 611 is obtained.

Figure 7:
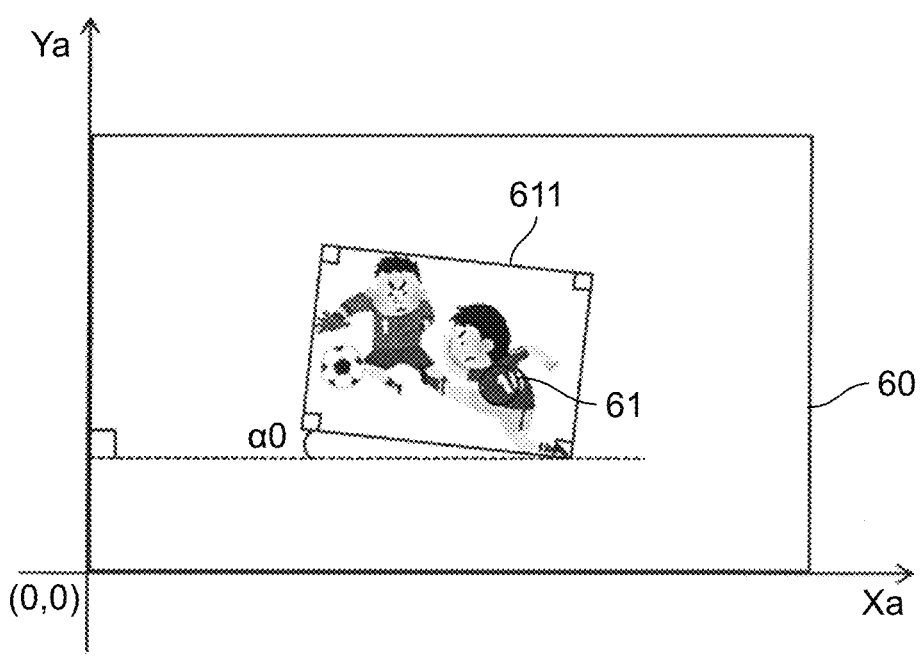
FIG. 7 is a plan view illustrating the important image region and the minimum circumscribed rectangle in the important image display processing in FIG. 4.

FIG. 7 is a plan view illustrating important image region 61 and minimum circumscribed rectangle 611 in the important image display processing S104 in FIG. 4. According to the above procedure, minimum circumscribed rectangle 611 and inclination angle α0 are obtained as illustrated in FIG. 7.

Next, a procedure for calculating projective transformation matrix H in step S307 will be described below with reference to FIG. 8.

Figure 8:
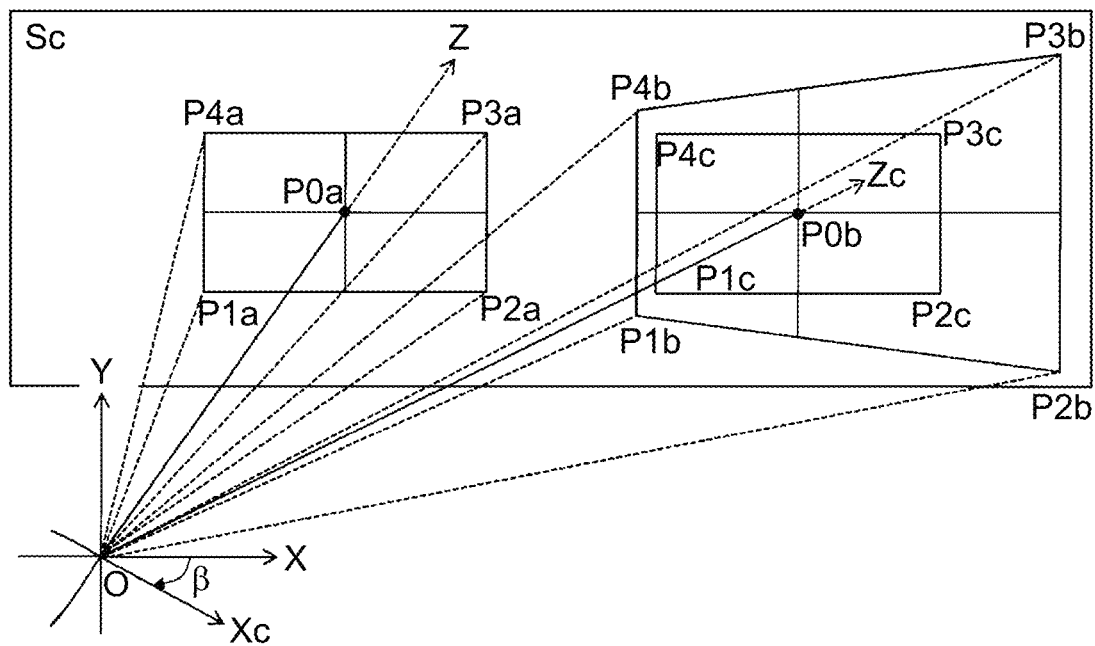
FIG. 8 is a perspective view illustrating a relationship between a display direction of the important image display device in FIG. 1 and an important image on a screen.

FIG. 8 is a perspective view illustrating a relationship between a display direction of important image display device 1 in FIG. 1 and an important image on the screen. In FIG. 8, plane Sc indicates a plane on which screen 3B is located. Further, origin O indicates an emission point of display device unit 140, and the Z axis indicates the optical axis of display device unit 140 in a case where both pan angle β and tilt angle γ are 0 degrees. Further, the X axis is a horizontal line perpendicular to the Z axis, and the Y axis is a vertical line perpendicular to the Z axis. When a Z-axis coordinate is represented by z and a distance from origin O of plane Sc is represented by L, plane Sc is expressed by an expression: z=L.

In FIG. 8, a region indicated by rectangle P1a-P2a-P3a-P4a indicates a displayable region of important image display device 1 in a case where the display direction of important image display device 1 is the Z-axis direction and roll angle α is 0 degrees. Further, point P0a is an intersection of the Z axis and plane Sc. Here, it is considered that pan angle β is increased. That is, the X axis and the Z axis are rotated by angle β in the right direction around the Y axis. The X axis and the Z axis after rotation are indicated by an Xc axis and a Zc axis, respectively. Further, an intersection between the Zc axis and plane Sc is indicated by P0b.

At this time, as illustrated in FIG. 8, since a distance from origin O to point P0b becomes long, the displayable region of important image display device 1 becomes larger than that before the rotation. In addition, since the angle of view of display device unit 140 is constant, the light projected toward the positive direction of the X axis in the drawing has a longer distance to plane Sc and diffuses more greatly. Therefore, the displayable region after the rotation is distorted like a trapezoid indicated by quadrangle P1b-P2b-P3b-P4b in FIG. 8. The displayable region of important image display device 1 represented by quadrangle P1b-P2b-P3b-P4b is corrected to rectangle P1c-P2c-P3c-P4c having the optical axis shared with quadrangle P1b-P2b-P3b-P4b and the same shape as rectangle P1a-P2a-P3a-P4a.

This distortion correction is generalized. In general, in a case where one point (x, y) on the X-Y plane is projected to another point (u, v) by projective transformation, this projective transformation can be expressed by the following expression using 3×3 projective transformation matrix H.

$$\begin{pmatrix} u \\ v \\ 1 \end{pmatrix} = H \begin{pmatrix} x \\ y \\ 1 \end{pmatrix}$$ [Mathematical Expression 1]

When four sets of points before and after projection using the projective transformation are given, projective transformation matrix H that satisfies the relationship of the points is uniquely determined. That is, when it is known that certain four points on the X-Y plane are moved to four points by the projective transformation represented by projective transformation matrix H, projective transformation matrix H is uniquely determined. Therefore, in FIG. 8, the projective transformation for projecting quadrangle P1b-P2b-P3b-P4b to the rectangle P1c-P2c-P3c-P4c can be expressed by unique projective transformation matrix H.

Projective transformation matrix H as described above is obtained, and in step S308, the important image data is projectively transformed into the image data of the corrected important image. In this manner, projective transformation matrix H is calculated based on a movement amount of the position of the important image in the entire image. Projective transformation matrix H is for projecting an important image obtained from the important image before movement, as it is, when the optical axis is moved onto the important image of minimum circumscribed rectangle 611 after the movement. The important image can be thus transformed into the corrected important image using projective transformation matrix H. That is, projective transformation matrix H for projecting quadrangle P1b-P2b-P3b-P4b onto rectangle P1c-P2c-P3c-P4c is calculated based on the movement amount of the position of the important image in the entire image. As a result, the important image can be transformed into the corrected important image.

Figure 9:
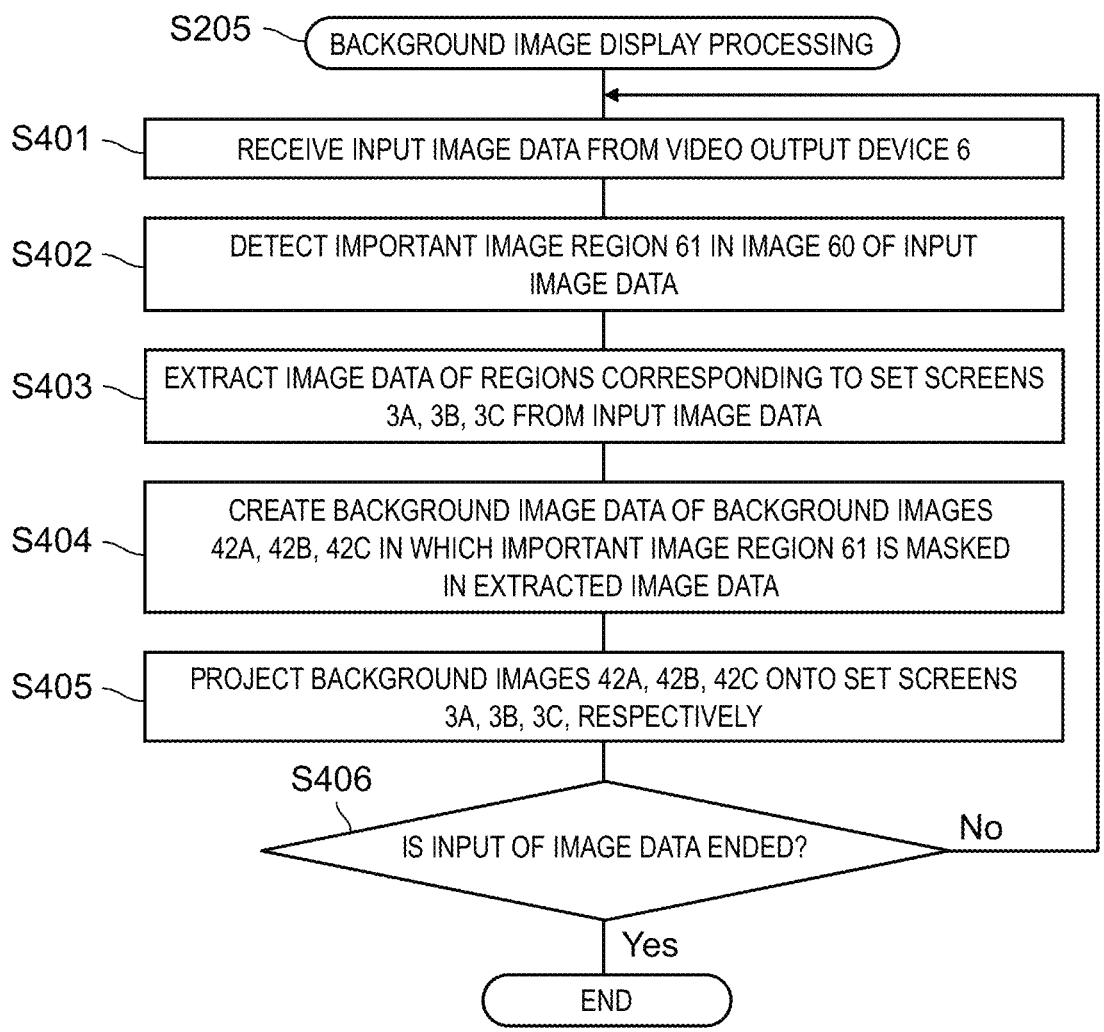
FIG. 9 is a flowchart illustrating a detailed operation example of the background image display device in FIG. 4.

FIG. 9 is a flowchart illustrating a detailed operation example of background image display devices 2A, 2B, 2C in FIG. 4. In FIG. 9, the background image display processing S205 includes steps S401 to S406.

In FIG. 9, in step S401, background image display devices 2A, 2B, 2C receive input image data from video output device 6. The operation in step S401 is similar to step S301 in the important image display processing S104 of FIG. 5.

In step S402, background image display devices 2A, 2B, 2C detect important image region 61 in image 60 of the input image data. The operation in step S402 is similar to step S302 in the important image display processing S104 of FIG. 5.

In step S403, background image display devices 2A, 2B, 2C extract image data of regions corresponding to screens 3A, 3B, 3C set in advance in steps S204A, S204B, and S204C from the input image data. For example, background image display device 2B extracts image data of a region to be displayed on screen 3B from the input image data.

In step S404, background image data is created. The background image data indicates background images 42A, 42B, 42C obtained by masking the image of important image region 61 detected in step S402 on the extracted image data. In step S405, background image display devices 2A, 2B, 2C project corresponding background images 42A, 42B, and 42C onto corresponding screens 3A, 3B, and 3C, respectively. In step S406, background image display devices 2A, 2B, 2C determine whether or not the input of the image data from video output device 6 has been ended. When the input of the image data has been ended (YES), the background image display processing S205 is ended. When the input of the image data has not been ended (NO), the processing returns to step S301, and the background image display processing S205 is repeated.

Figure 10:
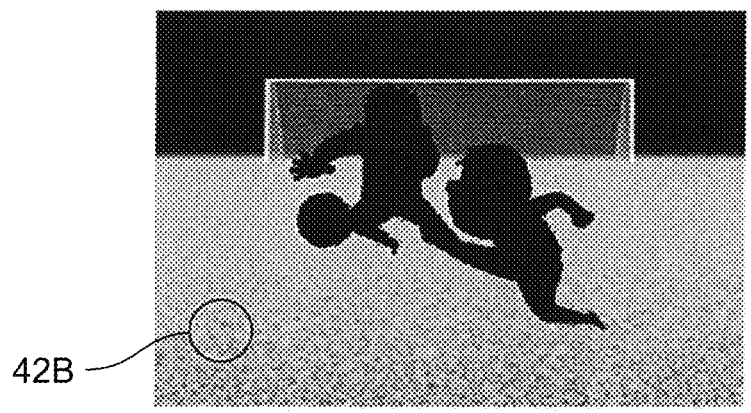
FIG. 10 is a front view illustrating the background image in FIG. 9.

FIG. 10 is a front view illustrating background image 42B in FIG. 9. As illustrated in FIG. 10, in step S404 of FIG. 9, background image display device 2B masks all the images of important image region 61 in the image data of the region to be displayed on screen 3B with black to obtain background image 42B. Here, all the images in important image region 61 are masked with black, but the present disclosure is not limited to this. When the important image is projected onto the masked portion, another color may be used as long as the appearance of the projected important image is not affected.

As described above, in video display system 800 according to the first exemplary embodiment, background image display devices 2A, 2B, 2C project and display background images 42A, 42B, 42C on screens 3A, 3B, 3C, respectively. The background images has been obtained by clipping a predetermined important image from an entire image including the important image and masking the clipped important image. Important image display device 1 displays the corrected important image on important image region 61 in background image 42B on screen 3B. At this time, rotation angle (roll angle) a around the optical axis of important image display device 1 is controlled in accordance with the aspect ratio of the important image so that the clipped important image is projected onto the region of the important image. The aspect ratio of the important image here is an aspect ratio based on minimum circumscribed rectangle 611. The important image is clipped in a form of a polygon so as to be inscribed in the polygon closed by a plurality of envelopes. Minimum circumscribed rectangle 611 is calculated to have an area of the rectangle circumscribing the polygon being minimum.

As described above, the important image is clipped as minimum circumscribed rectangle 611 having the smallest area by controlling rotation angle α around the optical axis of important image display device 1. Therefore, for example, optical zoom to the least extent can be performed on the important image. The pixel interval of the important image is not thus widened and is dense. On the other hand, in a case where rotation angle α around the optical axis is not controlled, it is difficult to clip the important image as minimum circumscribed rectangle 611. Therefore, for example, when the optical zoom is performed on the important image, the pixel interval of the important image is widened and becomes sparse. As described above, according to video display system 800 of the present disclosure, important image 41 can be displayed while the resolution of important image display device 1 is increased as much as possible. Further, even if the displayable region of important image display device 1 has a horizontally long shape whereas important image region 61 has a vertically long shape, the displayable region of important image display device 1 has a substantially vertically long shape when, for example, roll angle α of important image display device 1 is set to a value between 45° and 135°. Thus, the displayable region of important image display device 1 can be maximally used.

Further, when a display device that differs from background image display devices 2A, 2B, 2C in characteristics such as maximum luminance (contrast), color tone, or resolution of a video to be displayed is used as important image display device 1, it is possible to change the characteristics of the important image region in the displayed video so as to be locally more noticeably accentuated as an image. Furthermore, when a display device capable of displaying a stereoscopic video is used as important image display device 1, the important image region of the video to be displayed can be locally a stereoscopic video.

Second Exemplary Embodiment

Figure 11:
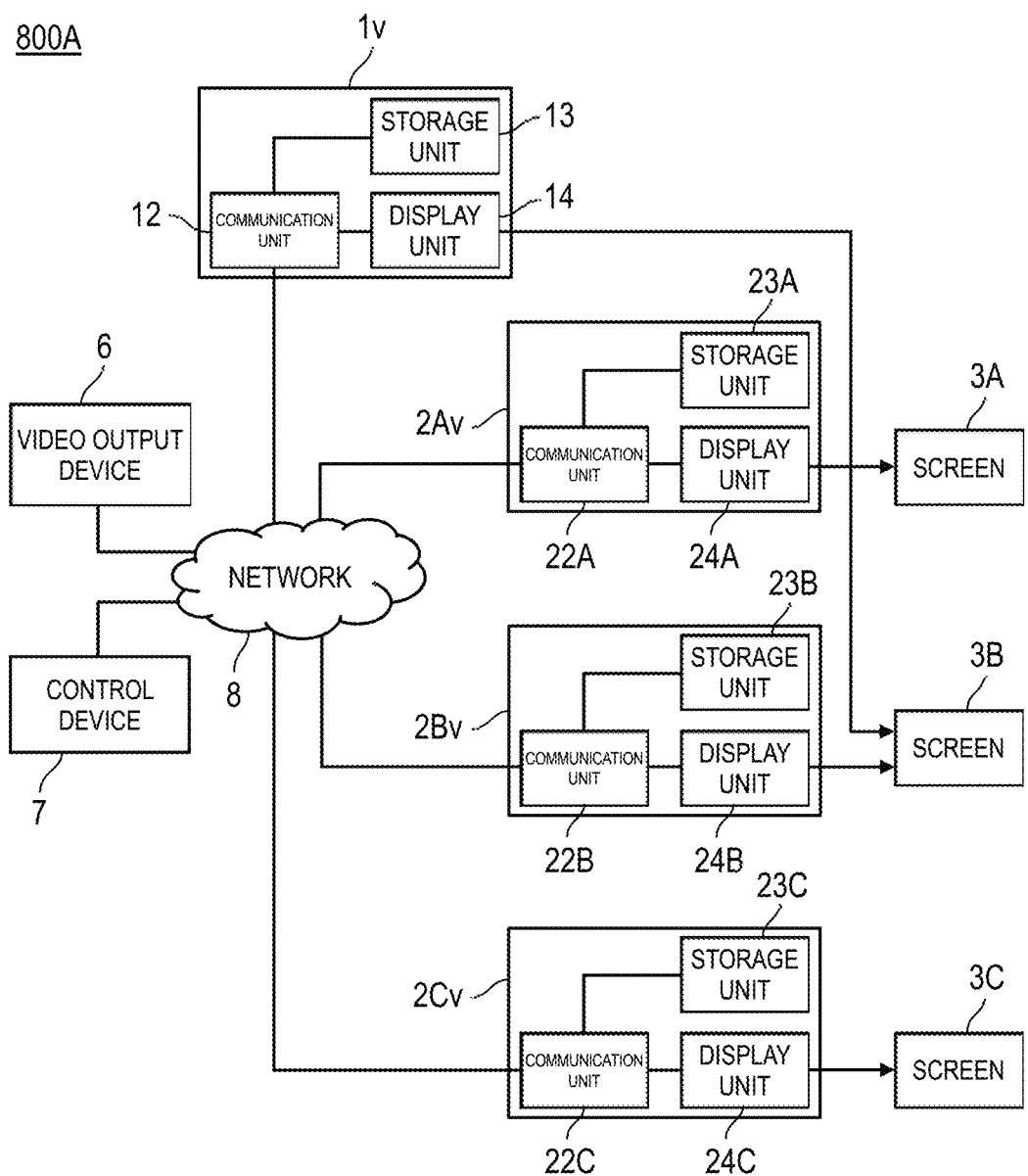
FIG. 11 is a block diagram illustrating a configuration example of a video display system according to a second exemplary embodiment.

FIG. 11 is a block diagram illustrating a configuration example of video display system 800A according to a second exemplary embodiment. In FIG. 11, video display system 800A is different from video display system 800 in FIG. 1 in the following points.

(1) Control device 7 is provided instead of controllers 11, 21A, 21B, 21C of video display system 800. (2) Control device 7 is connected to network 8 and controls the operations of important image display device 1v and background image display devices 2Av, 2Bv, 2Cv via communication units 12, 22A, 22B, 22C.

In FIG. 11, control device 7 controls storage units 13, 23A, 23B, 23C and display units 14, 24A, 24B, 24C via network 8 and communication units 12, 22A, 22B, 22C, and achieves various functions similar to those of controllers 11, 11A, 11B, 11C. As a result, the configurations of important image display device 1 and background image display devices 2A, 2B, 2C in the first exemplary embodiment can be downsized as compared with the first exemplary embodiment, and video display system 800 can be integrally controlled.

Third Exemplary Embodiment

Figure 12:
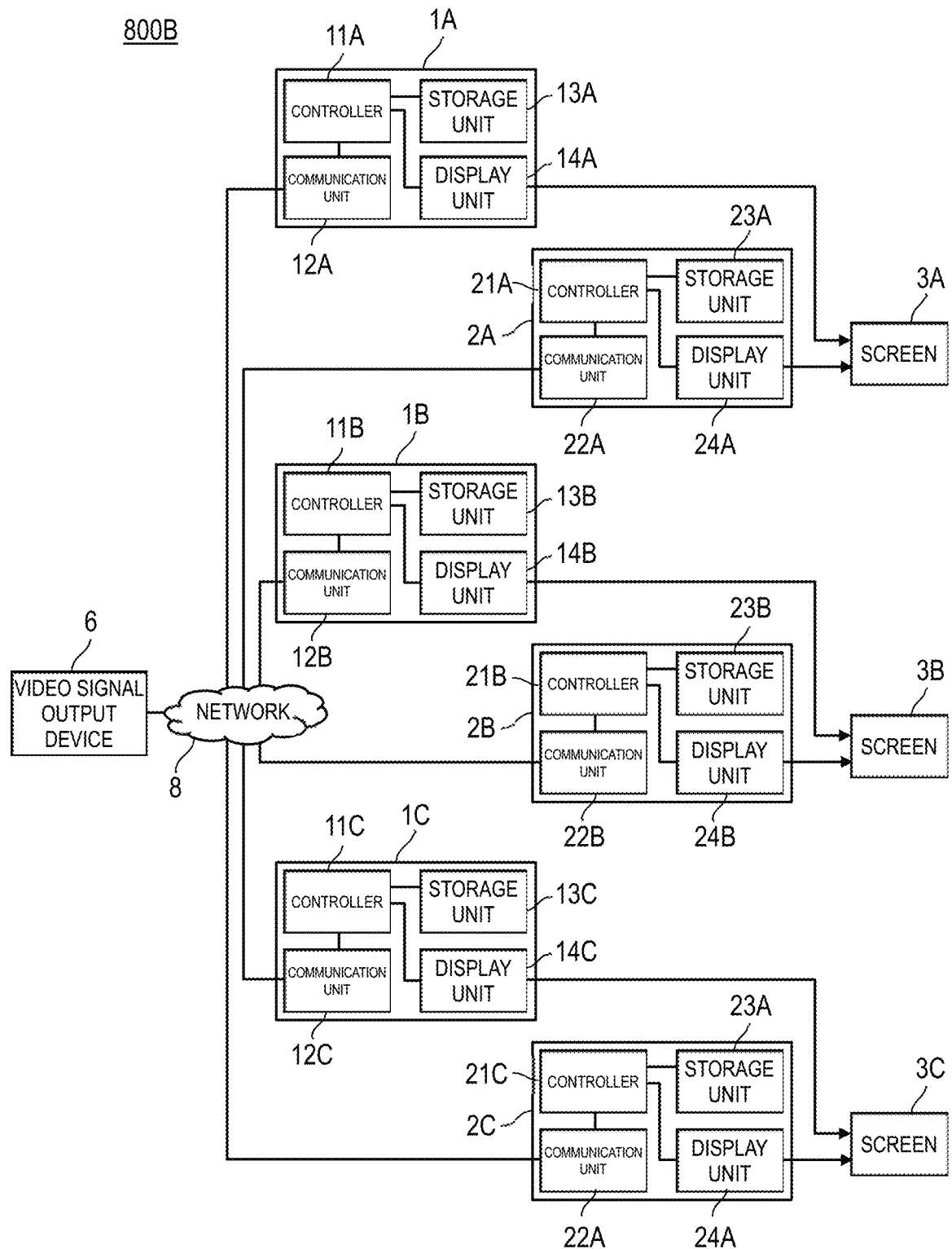
FIG. 12 is a block diagram illustrating a configuration example of a video display system according to a third exemplary embodiment.

FIG. 12 is a block diagram illustrating a configuration example of video display system 800B according to a third exemplary embodiment. In FIG. 12, video display system 800B is different from video display system 800 in the following points.

(1) Important image display device 1A corresponding to screen 3A and important image display device 1C corresponding to screen 3C are further provided. The configurations of important image display devices 1A, 1C are similar to the configuration of important image display device 1.

Figure 13:
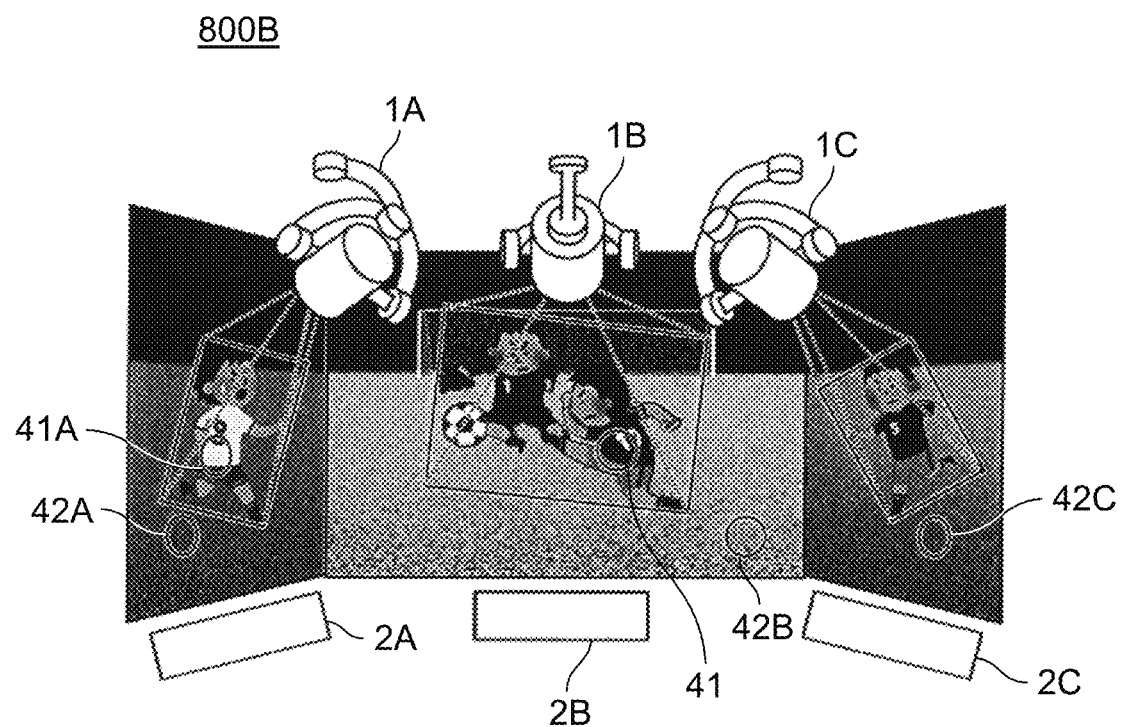
FIG. 13 is a perspective view illustrating an appearance example of the video display system in FIG. 12.

FIG. 13 is a perspective view illustrating an appearance example of video display system 800B in FIG. 12. As illustrated in FIG. 13, in the third exemplary embodiment, important images 41A, 41B, 41C exist in regions corresponding to the plurality of screens 3A, 3B, 3C, respectively, in the input image. The characteristics of the video displayed in each important image region can be locally changed by displaying important images 41A, 41B, 41C.

Fourth Exemplary Embodiment

Figure 14:
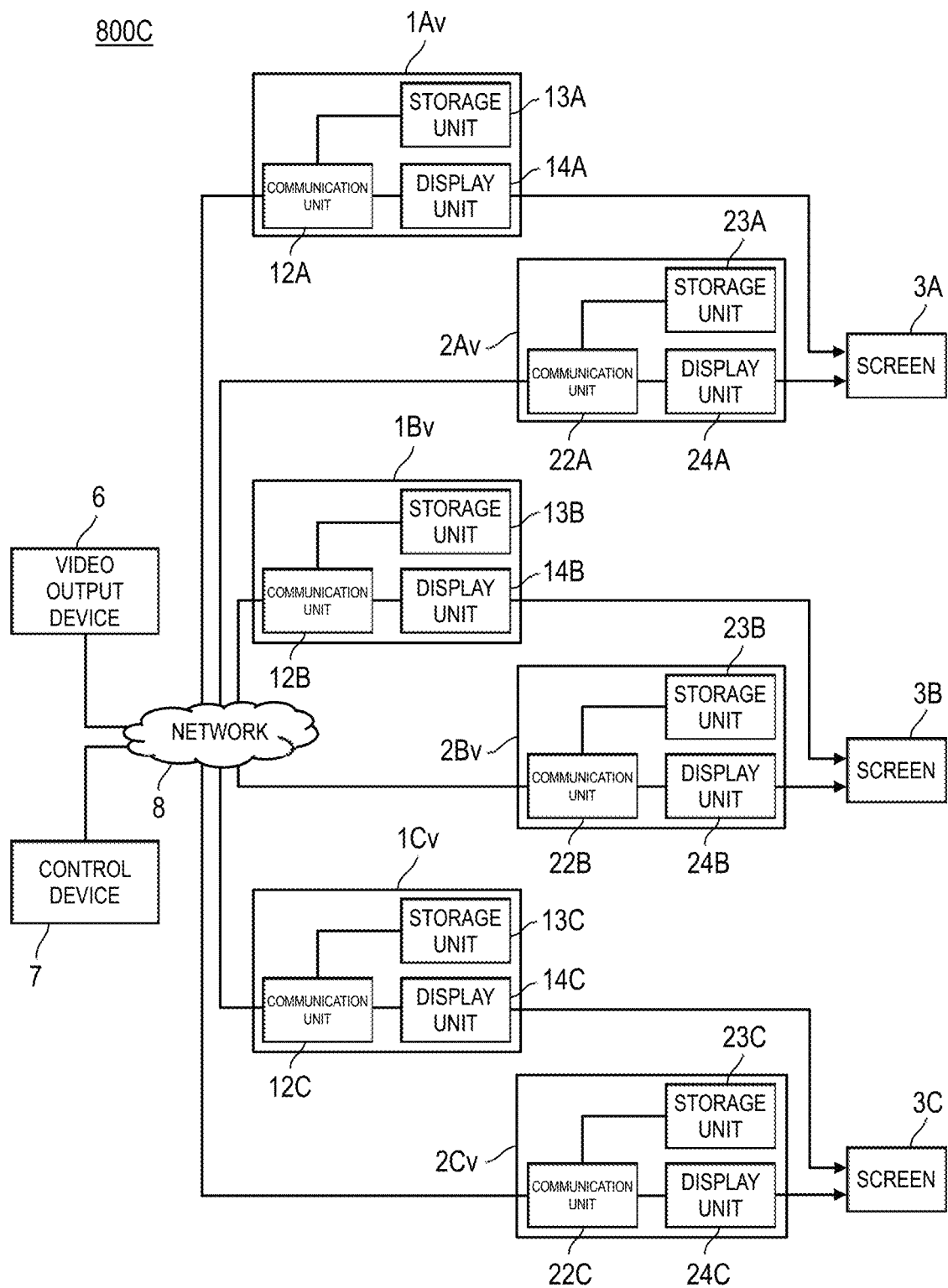
FIG. 14 is a block diagram illustrating a configuration example of a video display system according to a fourth exemplary embodiment.

FIG. 14 is a block diagram illustrating a configuration example of video display system 800C according to a fourth exemplary embodiment. Video display system 800 is different from video display system 800A in FIG. 11 in the following points.

(1) Important image display device 1Av corresponding to screen 3A and important image display device 1Cv corresponding to screen 3C are further provided.

As described above, a combined effect can be obtained by combining the features of video display systems 800A, 800B according to the second and third exemplary embodiments.

(Modifications)

Although video display systems 800, 800A, 800B according to the exemplary embodiments have been described above, the present disclosure is not limited to the exemplary embodiments described above. Various modifications that has been made to the above exemplary embodiments by those skilled in the art are included in the present disclosure without departing from the scope of the present disclosure.

(1) In the present embodiment, background image display devices 2A, 2B, 2C, 2Av, 2Ab, 2Ac extract important image region 61 without changing the size of image 60 of the input image data, but may extract important image region 61 after the size of image 60 is changed.

Figure 15:
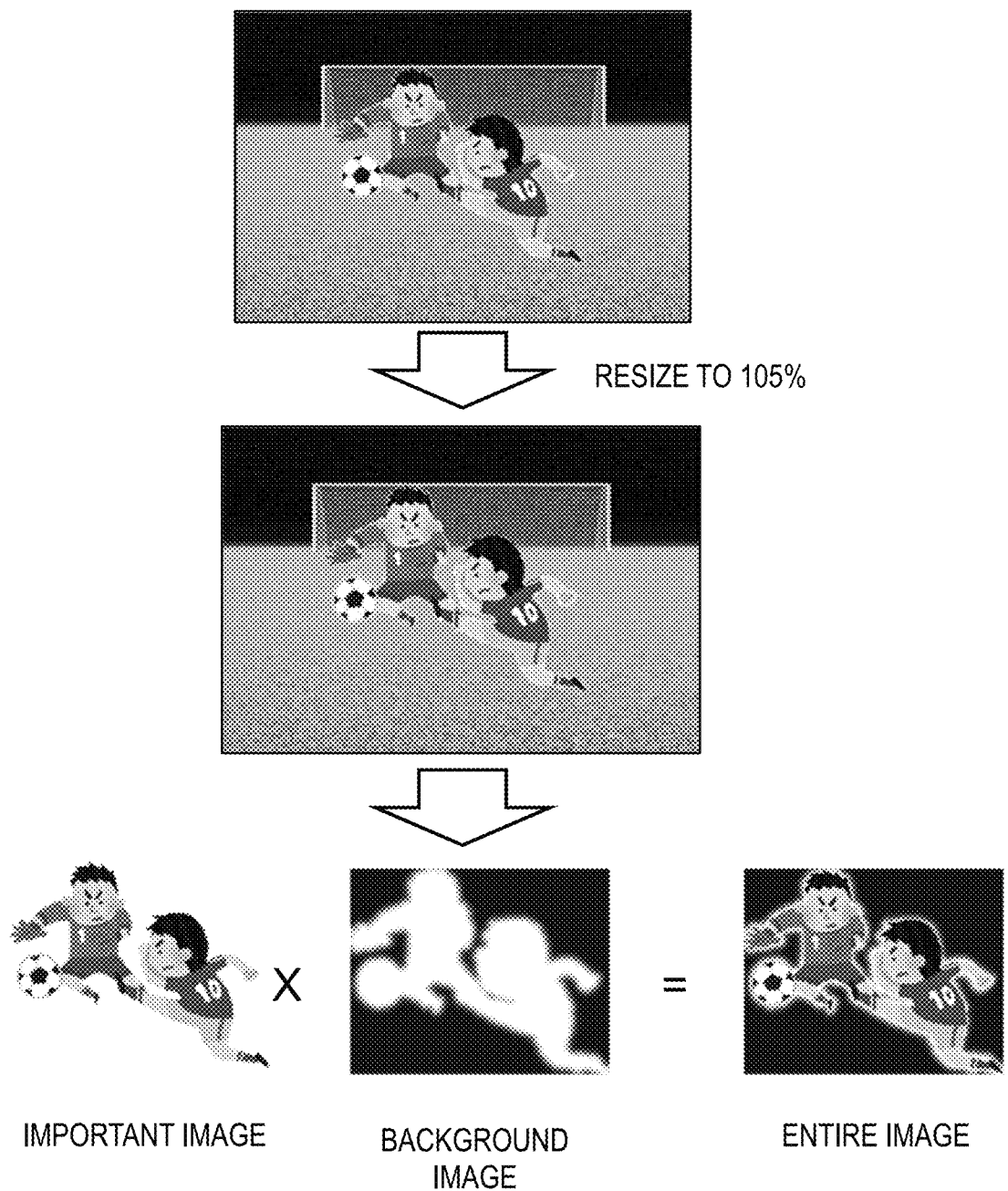
FIG. 15 is a diagram for describing superimposition of a background image and an important image of a video display system according to a modification.

FIG. 15 is a diagram for describing superimposition of a background image and an important image in a video display system according to the modification.

As illustrated in FIG. 15, the background image display device extracts image data of a region to be displayed on the screen from the input image data, and enlarges the extracted image data. The background image display device then creates background image data in which an important image region is masked, and displays a background image on the screen. Here, as an example, the image data is enlarged to 105%. On the other hand, the important image display device displays the important image as in the exemplary embodiments, that is, without changing the image data.

The above processing causes the entire image in which the boundary between the important image and the background image is blurred to be displayed on the screen. As a result, when the image is displayed on the screen, the image can be displayed without discomfort even if the position of the important image and the masked position of the background image do not completely match each other. In addition, since the boundary between the important image and the background image is blurred, a more natural entire image is displayed.

(2) In the present exemplary embodiment, the video of the important image region is displayed by important image display device 1, but the present disclosure is not limited thereto when the moving speed of the video of the important image region exceeds the following limit of important image display device 1.

Figure 16:
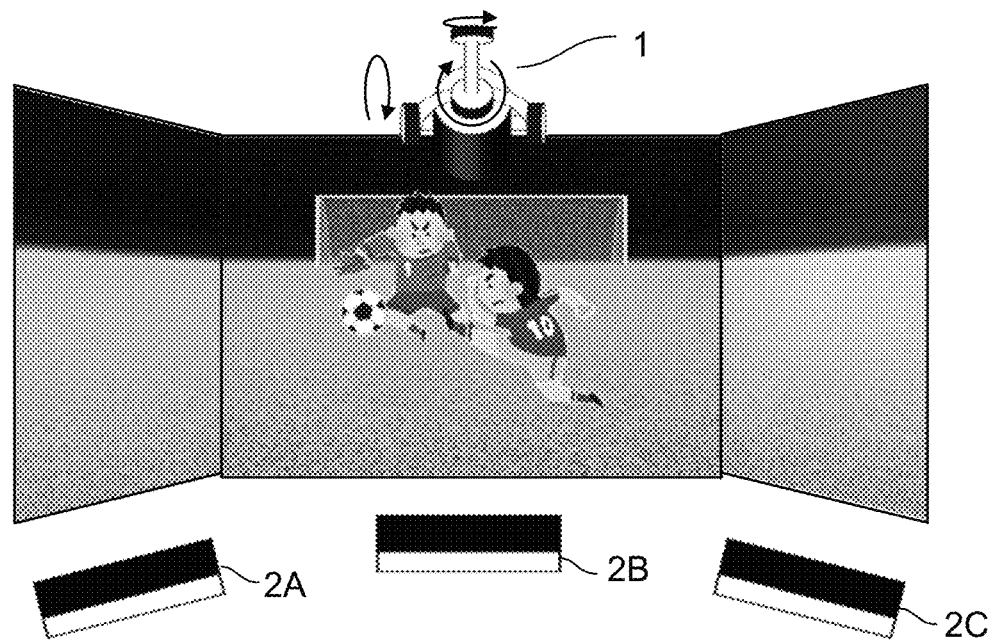
FIG. 16 is a view for describing an operation in a case where a moving speed of important image region exceeds a following limit in the video display system according to the modification.
Figure 17:
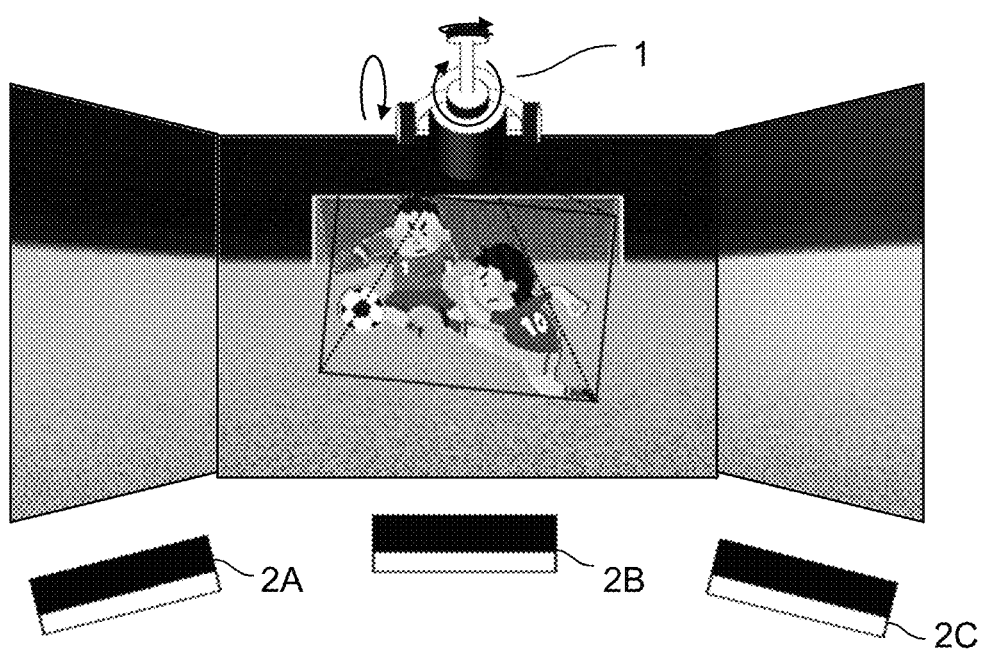
FIG. 17 is a view for describing the operation in a case where the moving speed of the important image region is within the following limit in the video display system according to the modification.

FIG. 16 is a diagram for describing an operation in a case where the moving speed of the important image region exceeds the following limit in the video display system according to the modification. FIG. 17 is a diagram for describing an operation in a case where the moving speed of the important image region is within the following limit in the video display system according to the modification.

As illustrated in FIG. 16, when the moving speed of the important image region exceeds the following limit of important image display device 1, important image display device 1 does not display the important image. Background image display devices 2A, 2B, 2C display the important image and the background image. A method for not allowing important image display device 1 to display the important image includes methods for closing a shutter of important image display device 1 and turning off an output. Further, background image display devices 2A, 2B, 2C receive image data including important image data and background image data. Therefore, background image display devices 2A, 2B, 2C can display the important image and the background image on the screen by omitting the processing for masking the important image region from the image data.

Then, as illustrated in FIG. 17, when the moving speed of the important image region falls within the following limit of the important image display device, important image display device 1 and background image display devices 2A, 2B, 2C may be operated as described in the present exemplary embodiment.

INDUSTRIAL APPLICABILITY

The present disclosure is applicable to a video display system including a plurality of projection video display devices such as projectors.

The invention claimed is:

1. A video display system comprising:
a first display device configured to project a background image onto a region of an entire image including a predetermined important image, the background image including a masked region of the important image clipped from the entire image;
a second display device configured to project the important image clipped from the entire image onto the region of the important image in the background image that has been projected; and
a controller configured to control a rotation angle around an optical axis of the second display device with respect to the important image to be projected, in accordance with an aspect ratio of the important image to project the important image clipped from the entire image onto the region of the important image.

2. The video display system according to claim 1,
wherein the important image is clipped in a form of a polygon closed by a plurality of envelopes so as to be inscribed in the polygon,
wherein the aspect ratio of the important image is an aspect ratio based on a minimum circumscribed rectangle calculated to have an area of a rectangle circumscribing the polygon being minimum, and
wherein the controller controls the rotation angle around the optical axis of the second display device with respect to the important image to be projected, in accordance with the aspect ratio based on the minimum circumscribed rectangle.

3. The video display system according to claim 1, wherein the controller controls a position of the optical axis of the second display device based on a change in a position of the important image in the entire image to project the important image clipped from the entire image onto the region of the important image.

4. The video display system according to claim 3, wherein the controller calculates a projective transformation matrix for projecting an important image obtained from the important image before movement when the optical axis of the second display device is moved onto an important image of a minimum circumscribed rectangle after the movement, based on a movement amount of the position of the important image clipped in the entire image to transform the important image before the movement into the important image after the movement using the projective transformation matrix, and projects a clipped important image onto the region of the important image.

5. The video display system according to claim 1, wherein the controller is disposed in the first display device and the second display device.

6. The video display system according to claim 1, wherein the controller is disposed in a control device other than the first display device and the second display device.

7. A video display method of a video display system, the video display system including a first display device configured to project a background image onto a region of an entire image including a predetermined important image,
the background image including a masked region of the important image clipped from the entire image; and
a second display device configured to project the important image clipped from the entire image onto the region of the important image in the background image that has been projected,
the video display method comprising controlling a rotation angle around an optical axis of the second display device with respect to the important image to be projected, in accordance with an aspect ratio of the important image to project the important image clipped from the entire image onto the region of the important image.

8. The video display method according to claim 7, further comprising:
clipping the important image in a form of a polygon closed by a plurality of envelopes so as to be inscribed in the polygon; and
calculating a minimum circumscribed rectangle to have an area of a rectangle circumscribing the polygon being minimum to
control the rotation angle around the optical axis of the second display device with respect to the important image to be projected, in accordance with an aspect based on the calculated minimum circumscribed rectangle.

* * * * *